(12) United States Patent
Kobayashi

(10) Patent No.: US 10,866,771 B2
(45) Date of Patent: Dec. 15, 2020

(54) INFORMATION PROCESSING APPARATUS AND CONTROL METHOD FOR INFORMATION PROCESSING APPARATUS

(71) Applicant: CANON KABUSHIKI KAISHA, Tokyo (JP)

(72) Inventor: Yo Kobayashi, Nagareyama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/514,742

(22) Filed: Jul. 17, 2019

(65) Prior Publication Data

US 2020/0034092 A1 Jan. 30, 2020

(30) Foreign Application Priority Data

Jul. 25, 2018 (JP) .................. 2018-139581

(51) Int. Cl.
*G06F 3/12* (2006.01)
*H04N 1/00* (2006.01)

(52) U.S. Cl.
CPC .......... *G06F 3/1221* (2013.01); *G06F 3/1229* (2013.01); *H04N 1/00896* (2013.01)

(58) Field of Classification Search
None
See application file for complete search history.

(56) References Cited

U.S. PATENT DOCUMENTS

| | | | | |
|---|---|---|---|---|
| 6,895,515 B1 * | 5/2005 | Yamazaki | ................. | G06F 1/24 713/1 |
| 8,578,185 B2 * | 11/2013 | Azuma | .............. | G03G 15/5004 713/300 |
| 2010/0275046 A1 * | 10/2010 | Shimazaki | ............ | G06F 1/3203 713/323 |
| 2011/0076038 A1 * | 3/2011 | Nakaminato | ...... | G03G 15/5004 399/37 |
| 2012/0127518 A1 * | 5/2012 | Ogata | ................... | G06F 1/3231 358/1.15 |
| 2012/0127538 A1 * | 5/2012 | Mamiya | ................ | G06F 1/3231 358/442 |
| 2012/0204046 A1 * | 8/2012 | Baba | ..................... | G06F 1/3203 713/323 |
| 2012/0229831 A1 * | 9/2012 | Kuroishi | ............ | H04N 1/00896 358/1.13 |

(Continued)

FOREIGN PATENT DOCUMENTS

JP 2010-262659 A 11/2010

*Primary Examiner* — Ted W Barnes

(74) *Attorney, Agent, or Firm* — Canon U.S.A., Inc. IP Division

(57) ABSTRACT

An information processing apparatus shifts to at least a first power state and to a second power state where more power is saved than that in the first power state, and includes an output unit configured to output an operation stop signal, a device configured to receive the operation stop signal, and configured to shift to an operation stop state based on the operation stop signal, and to a power saving mode of saving more power than that in the operation stop state, at least on condition that the operation stop signal is not input, and a signal output unit configured to receive the operation stop signal output from the output unit, and configured to output the operation stop signal to the device based on information indicating a power state of the information processing apparatus.

14 Claims, 13 Drawing Sheets

(56) References Cited

U.S. PATENT DOCUMENTS

| | | | |
|---|---|---|---|
| 2012/0290855 A1* | 11/2012 | Aoyagi | G06F 11/0757 713/300 |
| 2013/0201510 A1* | 8/2013 | Miyata | G06F 3/1278 358/1.13 |
| 2013/0219198 A1* | 8/2013 | Kuroishi | H04N 1/00904 713/310 |
| 2013/0250372 A1* | 9/2013 | Ogata | B60K 35/00 358/442 |
| 2013/0258424 A1* | 10/2013 | Ono | H04N 1/00323 358/475 |
| 2013/0300198 A1* | 11/2013 | Yamashina | G06K 15/406 307/39 |
| 2013/0305069 A1* | 11/2013 | Goda | G06F 1/3234 713/323 |
| 2014/0092417 A1* | 4/2014 | Kuroishi | H04N 1/00342 358/1.14 |
| 2014/0104630 A1* | 4/2014 | Baba | H04N 1/00323 358/1.13 |
| 2014/0104631 A1* | 4/2014 | Baba | G06K 9/00 358/1.13 |
| 2014/0104636 A1* | 4/2014 | Baba | H04N 1/00904 358/1.14 |
| 2014/0313536 A1* | 10/2014 | Takeuchi | G06F 1/3287 358/1.14 |
| 2015/0022837 A1* | 1/2015 | Kuroishi | G06K 15/4055 358/1.13 |
| 2015/0172494 A1* | 6/2015 | Kozuka | G06K 15/406 358/1.14 |
| 2016/0161931 A1* | 6/2016 | Kanda | G05B 19/042 700/20 |
| 2016/0165085 A1* | 6/2016 | Fukuoka | G06F 1/3287 358/1.13 |

* cited by examiner

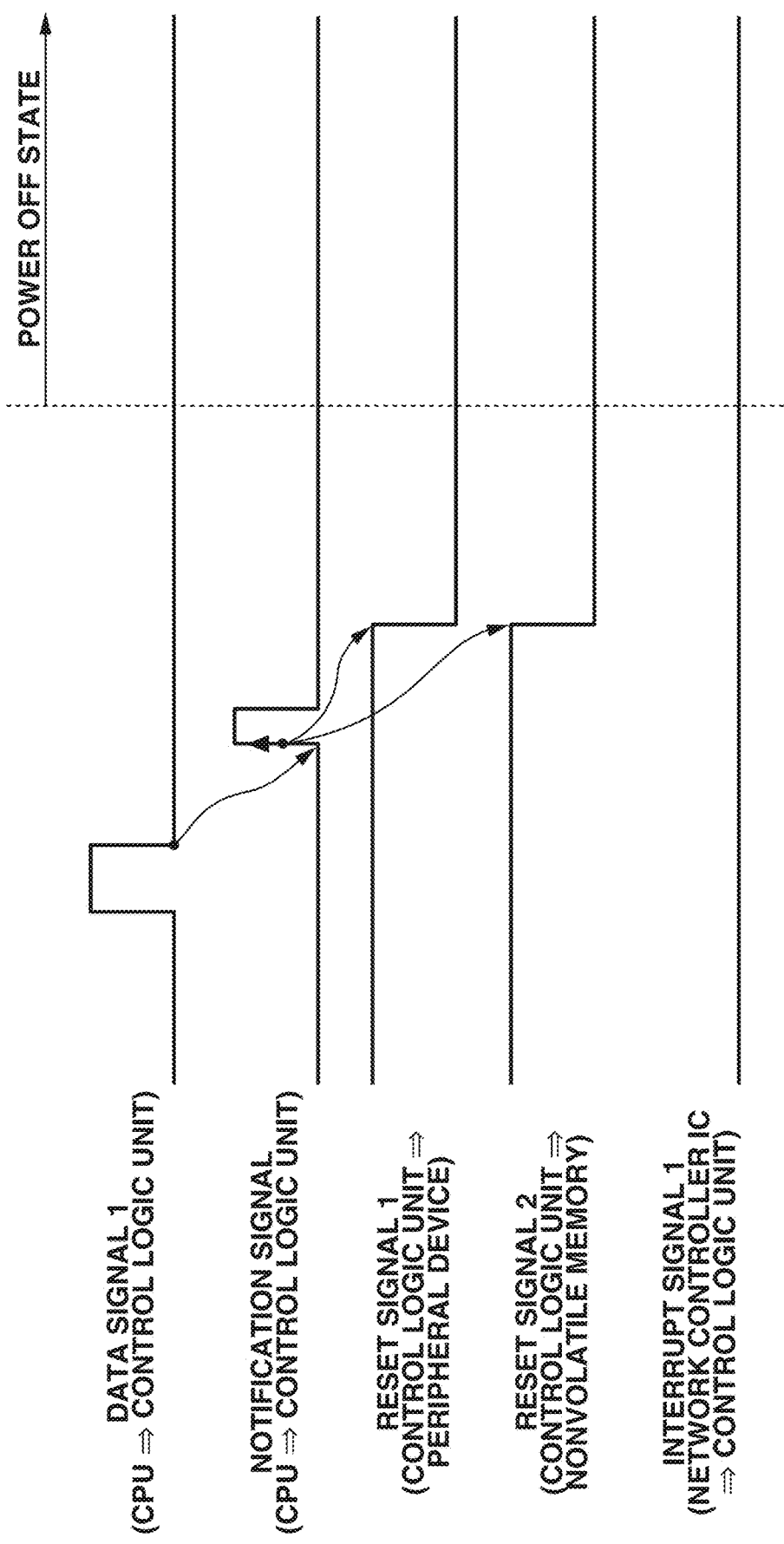

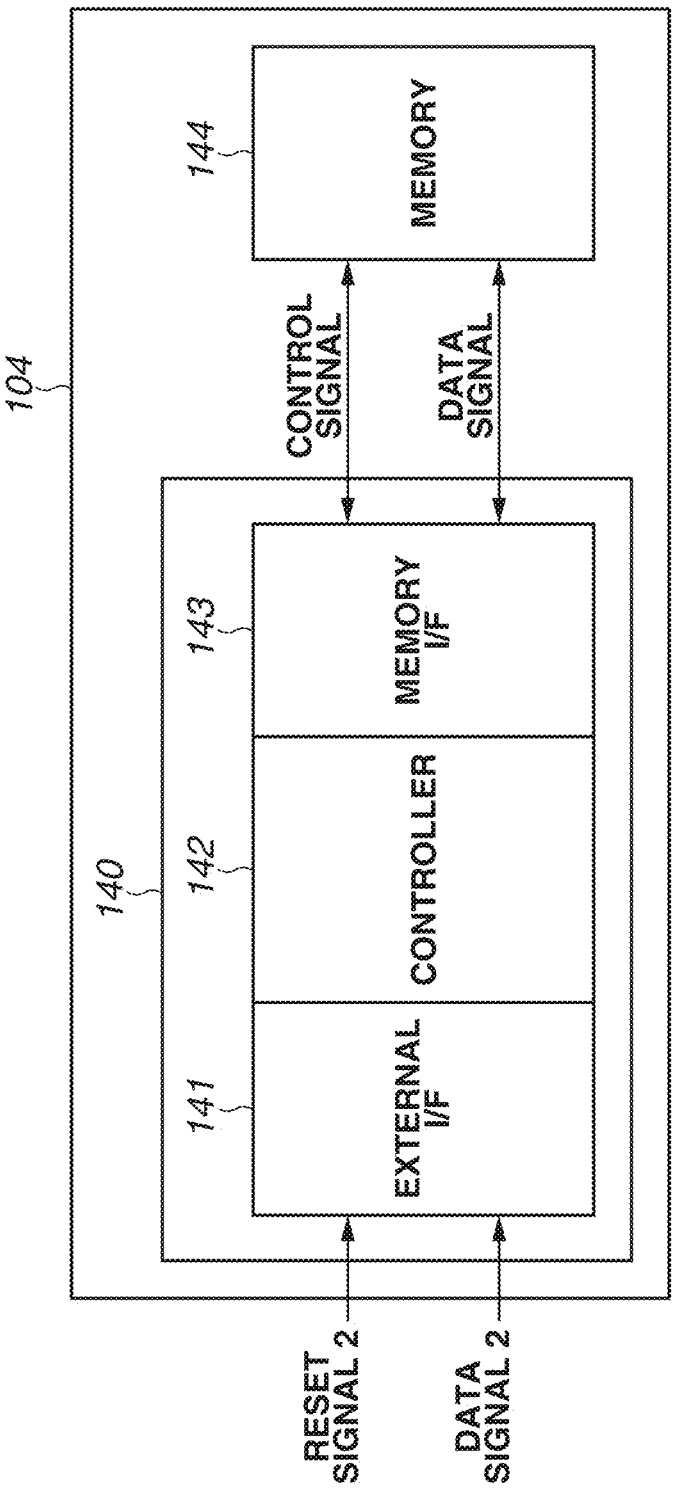

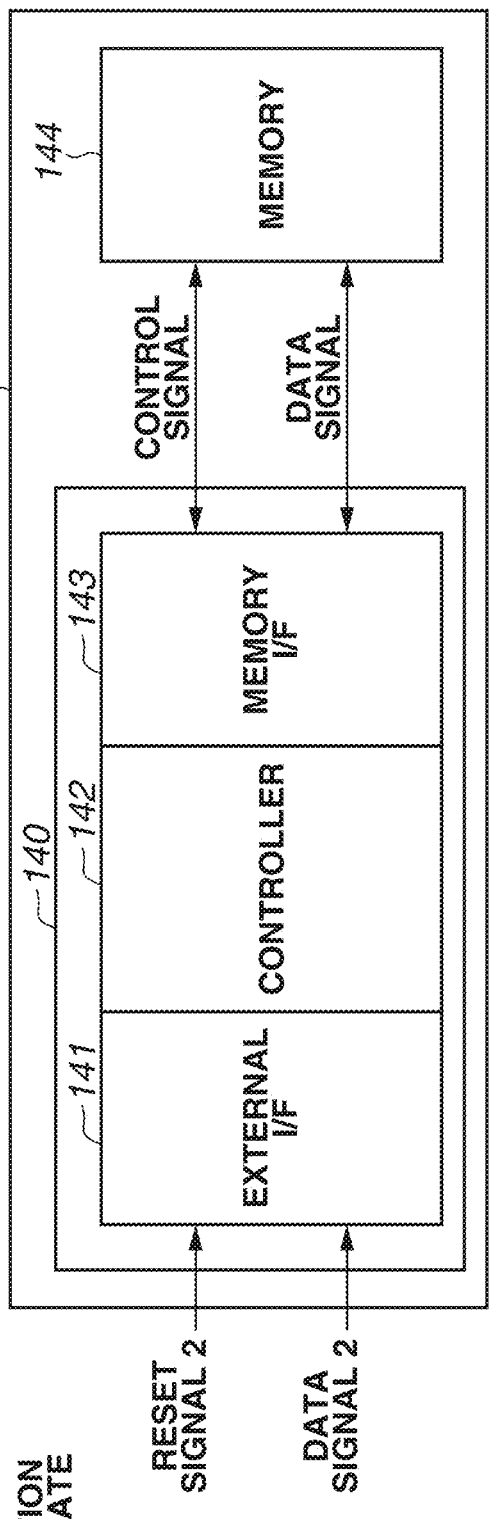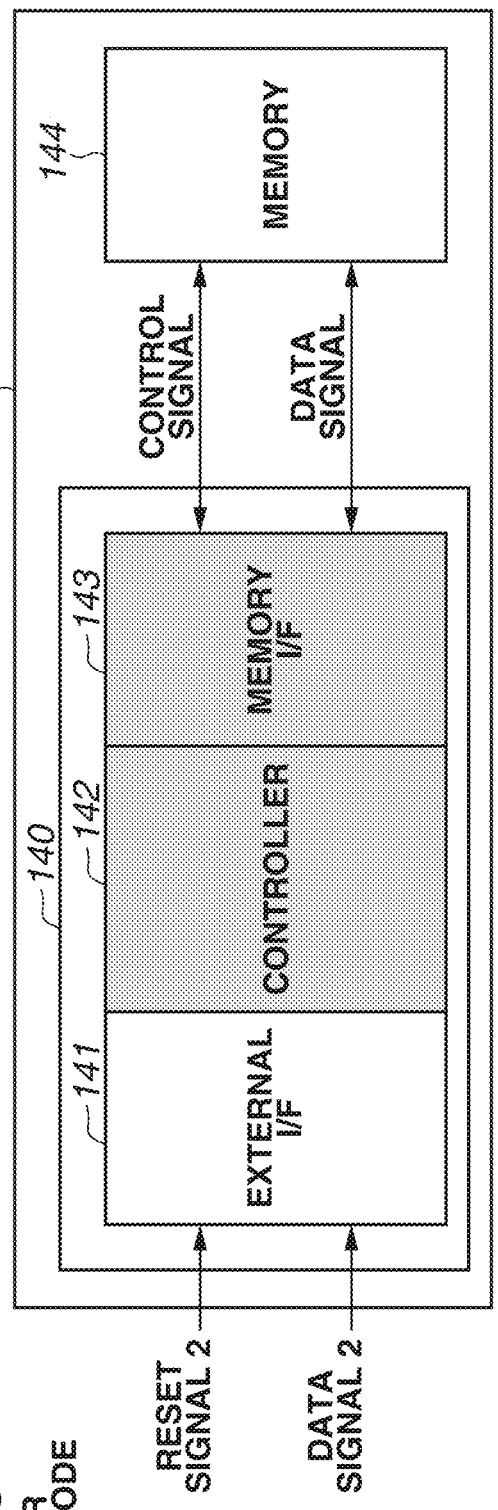

INFORMATION PROCESSING APPARATUS AND CONTROL METHOD FOR INFORMATION PROCESSING APPARATUS

BACKGROUND

Field

The present disclosure relates to an information processing apparatus and a control method for the information processing apparatus. The information processing apparatus includes a device capable of shifting to an operation stop state in accordance with an operation stop signal and to a power saving mode of saving more power than that in the operation stop state at least on condition that the operation stop signal is not input.

Description of the Related Art

For an information processing apparatus, such as a printer, a scanner, a personal computer, a tablet, and a smartphone, a further reduction in power consumption in a power saving state is desired. Some of the reasons for that are compliance with environmental regulations of each country, reductions in total running costs of an end user, and increases in battery driving time.

For example, Japanese Patent Application Laid-Open No. 2010-262659 discusses such a technology that a southbridge stops the operation of a peripheral device of the southbridge by outputting a reset signal, when a computer shifts to a power saving state. Because this prevents the peripheral device from executing various operations, the power consumption of the peripheral device decreases.

Peripheral devices include a device that automatically shifts to a power saving mode, even if a reset signal is not input to the device. For example, an embedded Multi-Media Card (eMMC) achieves a reduction in power consumption by interrupting part of the power supply within the eMMC at least on condition that a reset signal is not input.

When an information processing apparatus shifts to a power saving state, a host of a peripheral device outputs a reset signal to the peripheral device. The reset signal is then input to the peripheral device, and the peripheral device thereby enters an operation stop state, so that the power consumption of the peripheral device decreases.

However, the power consumption of the above-described eMMC in the power saving mode is less than the power consumption in the operation stop state brought by the reset signal. In other words, when the information processing apparatus shifts to the power saving state, if the reset signal is input to the peripheral device, such as the eMMC, and thereby the peripheral device shifts to the operation stop state, the power consumption of the information processing apparatus becomes greater than that in the power saving mode.

SUMMARY

Some embodiments are directed to an apparatus that shifts a peripheral device to a power saving mode of consuming less power than that in an operation stop state, by preventing an operation stop signal from being input to the peripheral device, when the apparatus shifts to a predetermined power state.

According to an aspect of some embodiments, an information processing apparatus shifts to at least a first power state and to a second power state where more power is saved than that in the first power state, and includes an output unit configured to output an operation stop signal, a device configured to receive the operation stop signal, and configured to shift to an operation stop state based on the operation stop signal, and to a power saving mode of saving more power than that in the operation stop state, at least on condition that the operation stop signal is not input, and a signal output unit configured to receive the operation stop signal output from the output unit, and configured to output the operation stop signal to the device based on information indicating a power state of the information processing apparatus.

Further features of various embodiments will become apparent from the following description of exemplary embodiments with reference to the attached drawings.

BRIEF DESCRIPTION OF THE DRAWINGS

FIG. 11 is a timing chart of each signal when the image forming apparatus shifts to a power off state.

FIG. 12 is a block diagram of a nonvolatile memory.

FIGS. 13A and 13B illustrate an operation stop state and a power saving mode, respectively, of the nonvolatile memory.

DESCRIPTION OF THE EMBODIMENTS

Exemplary embodiments will be described in detail below with reference to the drawings.

In each of the present exemplary embodiments, an image forming apparatus having a print function and a scan function will be described as an example of an information processing apparatus.

Figure 1:
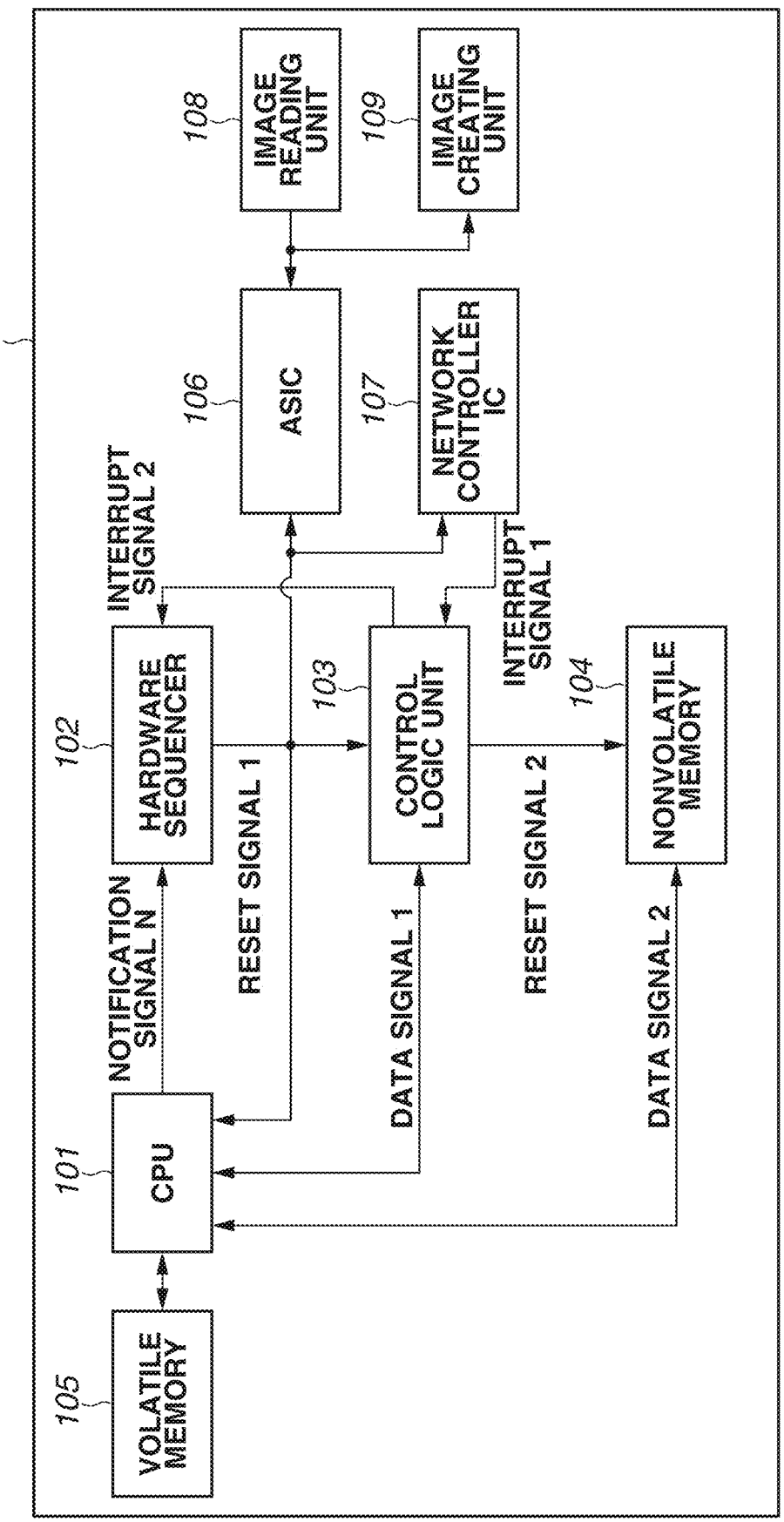
FIG. 1 is a hardware block diagram of an image forming apparatus.
Figure 2:
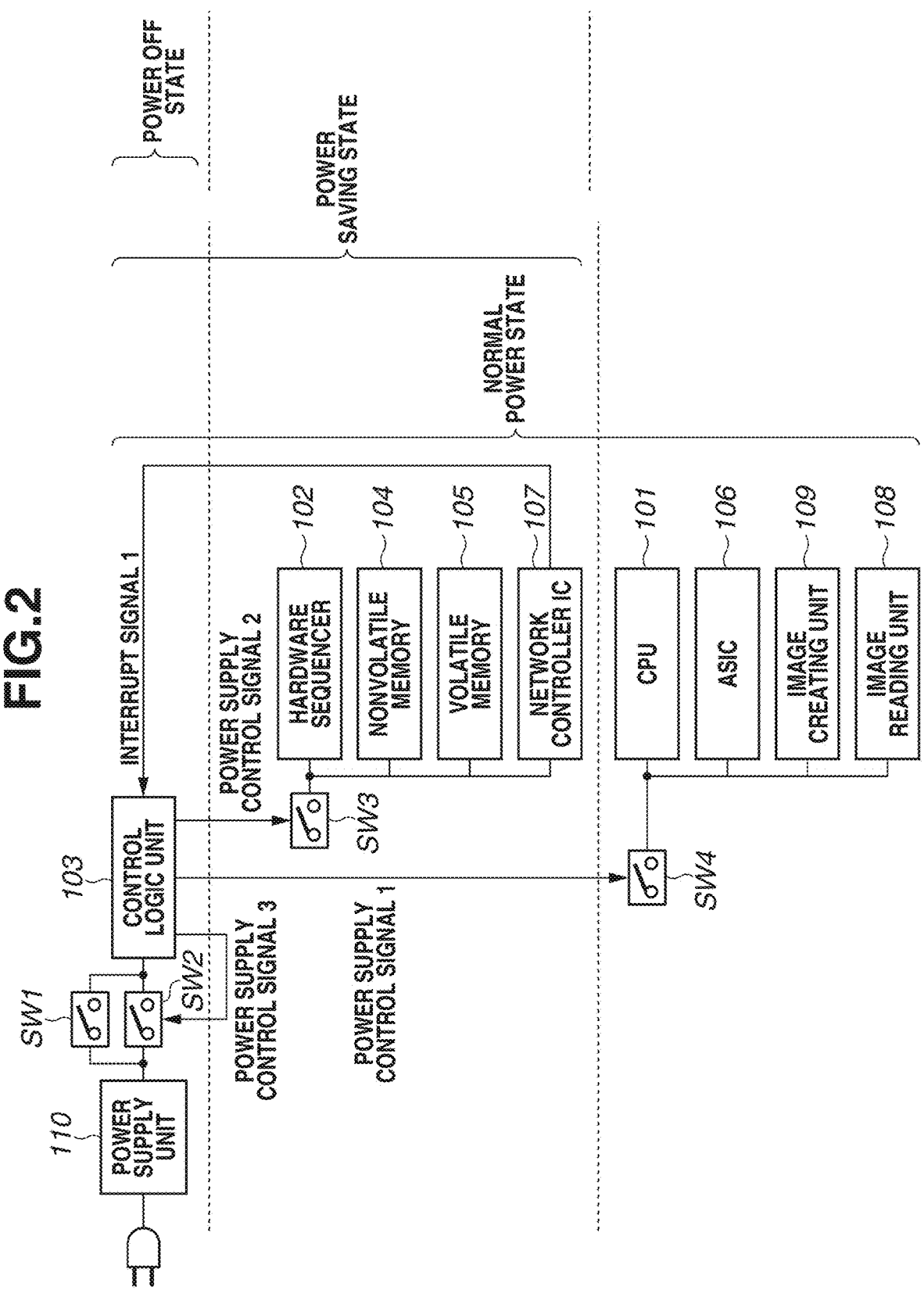
FIG. 2 is a power distribution diagram of the image forming apparatus.

FIG. 1 is a hardware block diagram of an image forming apparatus 100 according to a first exemplary embodiment. FIG. 2 is a power distribution diagram of the image forming apparatus 100.

The image forming apparatus 100 includes a central processing unit (CPU) 101, a hardware sequencer 102, a control logic unit 103, a nonvolatile memory 104, and a volatile memory 105. The image forming apparatus 100 further includes an application specific integrated circuit (ASIC) 106, a network controller integrated circuit (IC) 107, an image reading unit 108, and an image creating unit 109.

The CPU (i.e., a computing unit) 101 uses the volatile memory 105 as a memory for its own workspace. The CPU 101 performs various kinds of processing by executing a program stored in the nonvolatile memory 104. The CPU 101 can access a device (e.g., the nonvolatile memory 104) connected to the CPU 101.

The CPU 101 outputs a notification signal N indicating a power state of the image forming apparatus 100. The notification signal N indicates a power state to which the image forming apparatus 100 shifts next. Specifically, the CPU 101 outputs the notification signal N indicating a normal power state, when the image forming apparatus 100 shifts to the normal power state. The CPU 101 outputs the notification signal N indicating a power saving state, when the image forming apparatus 100 shifts to the power saving state where more power is saved than that in the normal power state. Furthermore, the CPU 101 outputs the notification signal N indicating a power off state, when the image forming apparatus 100 shifts to the power off state. These notification signals N are input to the hardware sequencer 102.

The CPU 101 receives a reset signal (e.g., an operation stop signal) 1. If the reset signal 1 is "Active", the CPU 101 is in a state where operation is stopped (e.g., an operation stop state). If the reset signal 1 is "InActive", the CPU 101 is in a state where operation is enabled (e.g., an operation enabled state). In the operation stop state, power consumption is less than that in the operation enabled state. The CPU 101 in the operation stop state cannot execute a program.

The hardware sequencer 102 can output the reset signal 1. In a case where the notification signal N received from the CPU 101 indicates the power saving state, the hardware sequencer 102 brings the reset signal 1 to Active. In a case where the notification signal N received from the CPU 101 indicates the power off state, the hardware sequencer 102 brings the reset signal 1 to Active. In a case where the notification signal N received from the CPU 101 indicates the normal power state, the hardware sequencer 102 brings the reset signal 1 to InActive. When the hardware sequencer 102 detects an edge of an interrupt signal 2, the hardware sequencer 102 brings the reset signal 1 to InActive.

The hardware sequencer 102 is provided to reduce power consumption of a peripheral device, by bringing the peripheral device to the operation stop state, when the image forming apparatus 100 enters the power saving state or the power off state. The peripheral device is the CPU 101, the ASIC 106, and the network controller IC 107.

The reset signal 1 of the present exemplary embodiment is Active at a Low level, and is InActive at a High level. The hardware sequencer 102 drives the reset signal 1 to the Low level, in order to reset the peripheral device. The logic of the reset signal 1 may be Active at the High level, and may be InActive at the Low level.

The notification signal N is output from the CPU 101 to the hardware sequencer 102 via a signal line. In some embodiments, the signal line is a 1 bit signal line. The signal pattern of the notification signal N indicates the power state. The signal line may be a multi bit signal line. Further, the CPU 101 and the hardware sequencer 102 may be integrated into the same IC.

The control logic unit 103 performs power control for each device within the image forming apparatus 100. The control logic unit 103 receives the reset signal 1, a data signal 1, and an interrupt signal 1. The data signal 1 is output from the CPU 101 to the control logic unit 103 via a data signal line. The data signal 1 is a signal indicating a power state of the image forming apparatus 100. The data signal 1 indicates a power state to which the image forming apparatus 100 shifts next. The control logic unit 103 has a power supply control register. In the power supply control register, the power state indicated by the data signal 1 is set. In other words, the CPU 101 sets, via the data signal line, the power state to which the image forming apparatus 100 shifts next to the power supply control register. In the present exemplary embodiment, the control logic unit 103 outputs a reset signal (e.g., an operation stop signal) 2 to the nonvolatile memory 104, based on a value set in the power supply control register. The value set in the power supply control register indicates any one of the normal power state, the power saving state, and the power off state.

The power state of the image forming apparatus 100 will be described in detail. The normal power state is, for example, a state where printing is executed, and where the image creating unit 109 is in operation. The normal power state is a state where reading is executed, and where the image reading unit 108 is in operation. In the present exemplary embodiment, a shift to a standby state occurs upon completion of printing or completion of reading. The standby state is also included in the normal power state. In the normal power state, power consumption is greater than that in the power saving state and that in the power off state.

The power saving state is a state to which the image forming apparatus 100 shifts when there is no operation from a user or no print job is received via a network for a predetermined period in the above-described standby state. In the power saving state, power supply to the CPU 101, the ASIC 106, the image reading unit 108, and the image creating unit 109 is stopped. Further, in the power saving state, power is supplied to the volatile memory 105 so that the CPU 101 executes a program immediately. In the power saving state, power is supplied to the network controller IC 107 so that a print job can be received via the network.

The power off state is a state where the power is supplied only to a power supply unit 110 of the image forming apparatus 100. When a power supply switch provided in the image forming apparatus 100 is pressed, the power is supplied to each unit of the image forming apparatus 100, and the power state of the image forming apparatus 100 shifts to the normal power state. When the power supply switch is pressed in the normal power state or the power saving state, the power state of the image forming apparatus 100 shifts to the power off state. A mechanism may be provided to prevent the power from being stopped immediately after the power supply switch is pressed. With such a mechanism, the power state of the image forming apparatus 100 may shift to the power off state after shutdown processing including processing for terminating an application and an operating system (OS) is completed.

The control logic unit 103 outputs the reset signal 1 output from the hardware sequencer 102, as a reset signal 2, based on the value stored in the power supply control register. Specifically, the control logic unit 103 brings the reset signal 2 to Active, in a case where the value of the power supply control register indicates the normal power state. In other words, the control logic unit 103 does not mask the reset signal 1, in a case where the value of the power supply control register indicates the normal power state. The control logic unit 103 brings the reset signal 2 to Active, in a case where the value of the power supply control register indicates the power off state. In other words, the control logic unit 103 does not mask the reset signal 1, in a case where the value of the power supply control register indicates the power off state.

In the present exemplary embodiment, the control logic unit 103 brings the reset signal 2 to InActive, in a case where the value of the power supply control register indicates the power saving state. In other words, the control logic unit 103 masks the reset signal 1, in a case where the value of the power supply control register indicates the power off state. When the image forming apparatus 100 shifts to the power saving state, the control logic unit 103 brings the reset signal 2 to InActive even if the reset signal 1 is Active.

The control logic unit 103 outputs the interrupt signal 2. The interrupt signal 2 is input to the hardware sequencer 102. When detecting an edge of the interrupt signal 2, the hardware sequencer 102 brings the reset signal 1 to InActive (e.g., High). For example, the network controller IC 107 outputs the interrupt signal 1, when the network controller IC 107 receives a wake-up packet via the network, in a case where the image forming apparatus 100 is in the power saving state. When detecting an edge of the interrupt signal 1, the control logic unit 103 outputs the interrupt signal 2. When detecting an edge of the interrupt signal 2, the hardware sequencer 102 brings the reset signal 1 to InActive. This cancels the reset of the CPU 101, and the CPU 101 enters a state where a program can be executed (e.g., the operation enabled state).

The nonvolatile memory 104 is an embedded Multi-Media Card (eMMC). As illustrated in FIG. 12, the nonvolatile memory 104 has a memory (a NAND Flash) 144. The nonvolatile memory 104 further includes a memory controller 140 for writing data in and reading data from the memory 144, and a cache (not illustrated). The memory controller 140 includes an external interface (I/F) 141, a controller 142, and a memory OF 143.

The nonvolatile memory 104 stores an OS of the image forming apparatus 100 and a boot loader for loading the OS into the volatile memory 105. The nonvolatile memory 104 shifts to a power saving mode an auto power saving mode), at least on condition that the reset signal (e.g., the reset signal 2 in the present exemplary embodiment) is not input (InActive e.g., High in this embodiment). Specifically, the nonvolatile memory 104 shifts to the power saving mode, on condition that processing based on a command transmitted from the CPU 101 is completed, and also, there is no access from the CPU 101 for a predetermined time and the reset signal is not input. In the present exemplary embodiment, the nonvolatile memory 104 is the eMMC. However, the nonvolatile memory 104 is not limited to the eMMC, and may be any type of memory, as long as the nonvolatile memory 104 can receive the reset signal, and has a function of automatically shifting to the power saving mode at least on condition that the reset signal is not input.

In the nonvolatile memory 104, the external I/F 141 receives the reset signal 2. The external I/F 141 further receives a data signal 2. The controller 142 writes data in the memory 144 via the memory I/F 143, based on the data signal 2 (e.g., a write command). The controller 142 further reads out data from the memory 144 via the memory I/F 143, based on the data signal 2 (e.g., a read command).

The nonvolatile memory 104 can shift to the operation stop state and the power saving mode, as illustrated in FIGS. 13A and 13B. When the reset signal 2 is input to the external I/F 141, the nonvolatile memory 104 shifts to the operation stop state illustrated in FIG. 13A. The nonvolatile memory 104 shifts to the power saving mode illustrated in FIG. 13B, on condition that processing based on a command transmitted from the CPU 101 is completed, and also, there is no access from the CPU 101 for the predetermined time and the reset signal is not input. When the nonvolatile memory 104 shifts to the operation stop state, the controller 142 cannot execute a program, and the power consumption becomes less than that in the normal state. When the nonvolatile memory 104 shifts to the power saving mode, the power consumption becomes less than that in the operation stop state.

In the power saving mode, the power supply to some of power domains of the nonvolatile memory 104 is stopped. Specifically, in the power saving mode, the power supply to the controller 142 and the memory I/F 143 is stopped. When receiving a command, the nonvolatile memory 104 returns from the power saving mode to the normal state.

Software such as the OS stored in the nonvolatile memory 104 is loaded into the volatile memory 105. The volatile memory 105 is used as the memory for the workspace of the CPU 101.

The ASIC 106 is a device that can communicate with the CPU 101 via a data line (not illustrated). The ASIC 106 performs, for example, image processing for input image data and performs encryption of data. The reset signal 1 is also input to the ASIC 106.

The network controller IC 107 is a device that communicates with an external device via a network, such as a local area network (LAN). Upon receiving a wake-up packet from the external device when the image forming apparatus 100 is in the power saving state, the network controller IC 107 outputs the interrupt signal 1. When detecting an edge of the interrupt signal 1, the control logic unit 103 outputs a power supply control signal 1 as illustrated in FIG. 2. The power is thereby supplied to the CPU 101, the ASIC 106, the image creating unit 109, and the image reading unit 108. Accordingly, the image forming apparatus 100 shifts from the power saving state to the normal power state. The network controller IC 107 communicates with the external device by wire or wirelessly.

The image reading unit 108 irradiates a document placed on a pressing plate or an automatic document feeder (ADF) with light, and receives reflected light with an image sensor. The image sensor outputs image data in digital form. The image data output from the image reading unit 108 is input to the ASIC 106. The ASIC 106 performs filtering for a noise component of the image data, and performs compression and decompression of the image data. The ASIC 106 transmits the image data to the image creating unit 109 as needed. The image creating unit 109 forms, based on the image data, an image on a paper medium using toner.

The power supply unit 110 supplies the power to each unit of the image forming apparatus 100, as illustrated in FIG. 2. The power supply unit 110 is an alternating-current-to-direct-current (AC-DC) converter. The control logic unit 103 can change the power state of the image forming apparatus 100 by controlling supply and stop of the power from the power supply unit 110. The control logic unit 103 supplies the power to each unit of the image forming apparatus 100 by turning on relay switches SW3 and SW4 when the image forming apparatus 100 is in the normal power state. Further, the control logic unit 103 turns off the relay switch SW4 by controlling the power supply control signal 1 when the image forming apparatus 100 is in the power saving state. This stops the power supply to the CPU 101, the ASIC 106, the image creating unit 109, and the image reading unit 108. The control logic unit 103 turns off the relay switches SW3 and SW4 by controlling the power supply control signal 1 and a power supply control signal 2 when the image forming apparatus 100 is in the power off state. This processing stops the power supply to the hardware sequencer 102, the nonvolatile memory 104, the volatile memory 105, the network controller IC 107, the CPU 101, the ASIC 106, the image creating unit 109, and the image reading unit 108. The control logic unit 103 turns off a relay switch SW2 by controlling a power supply control signal 3, when the image forming apparatus 100 is in the power off state, so that the power supply to itself (i.e., the control logic unit 103) also stops.

When powering off the image forming apparatus 100, the user turns off the power supply switch SW1. Accordingly, the CPU 101 executes termination processing, such as the shutdown processing, and the control logic unit 103 turns off the relay switches SW2, SW3, and SW4. When powering on the image forming apparatus 100, the user turns on the power supply switch SW1. At this moment, the relay switch SW2 disposed in parallel with the power supply switch SW1 is also turned on, by interlocking with the power supply switch SW1.

Figure 3:
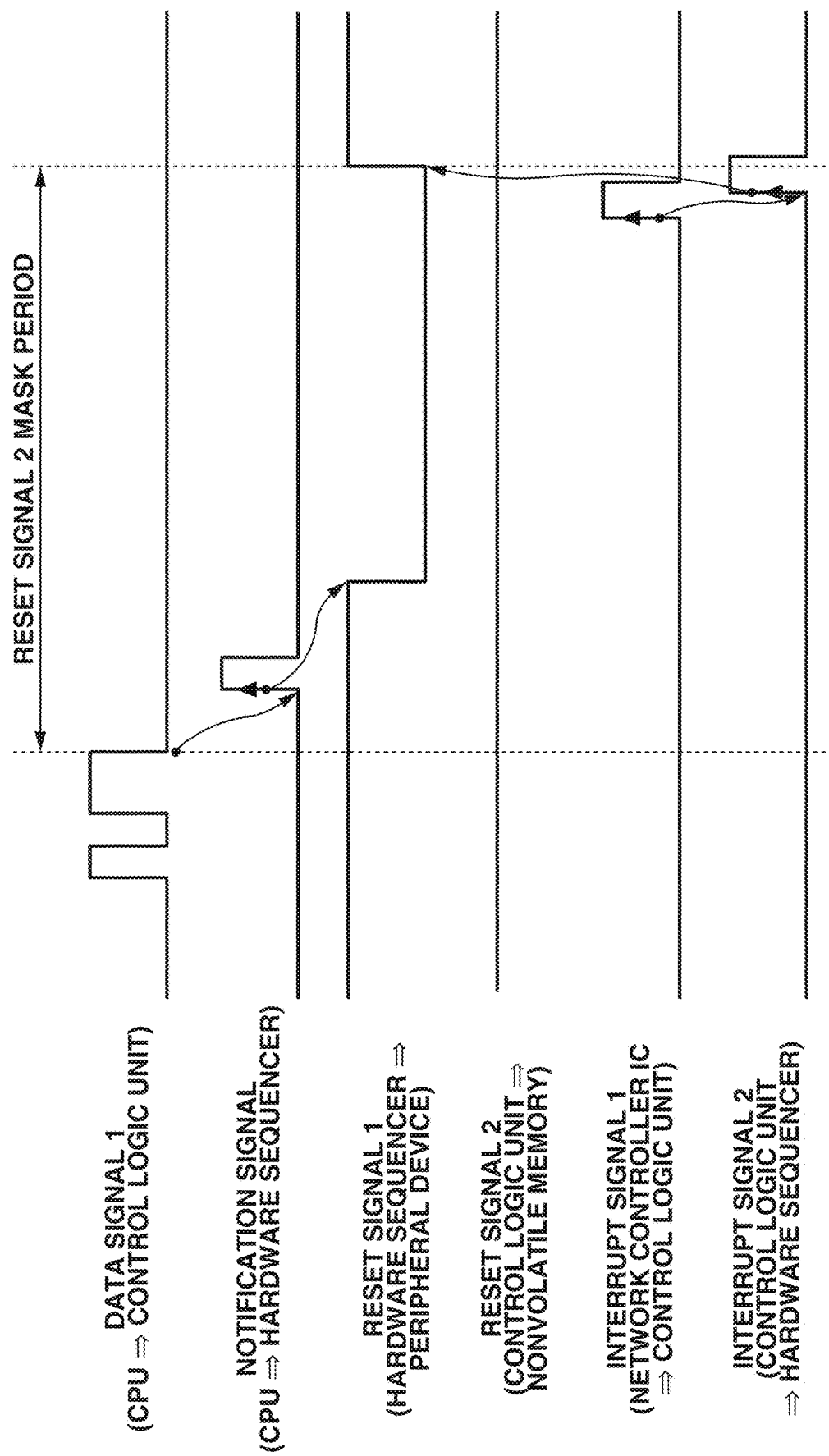
FIG. 3 is a timing chart of each signal when the image forming apparatus shifts to a power saving state.

FIG. 3 is a timing chart of each signal when the image forming apparatus 100 shifts to the power saving state. Each waveform in the timing chart illustrated in FIG. 3 and the subsequent figures is only an example and is not intended to limit, for example, the logic of a signal and the waveform of a signal, and to specify whether a trigger is an edge trigger or a level trigger.

First, the CPU 101 outputs the data signal 1 indicating the power state to which the image forming apparatus 100 shifts next (e.g., the power saving state). A value indicating the power state indicated by the data signal 1 is set in the power supply control register of the control logic unit 103.

Next, the CPU 101 that has output the data signal 1 outputs a pulse signal indicating the power saving state (e.g., the notification signal N) to the hardware sequencer 102.

Upon detecting a rising edge of the notification signal N, the hardware sequencer 102 brings the reset signal 1 to Active (Low) in order to reset the peripheral device. At this moment, the reset signal 1 to be input to the control logic unit 103 is also Active (Low). However, since the value of the power supply control register indicates the power saving state, the control logic unit 103 does not bring the reset signal 2 to Active. In other words, the control logic unit 103 masks the reset signal 1, based on the value of the power supply control register. The reset signal 2 to be input to the nonvolatile memory 104 thereby remains InActive. Thus, the reset signal 2 can be prevented from being input to the nonvolatile memory 104, when the image forming apparatus 100 is in the power saving state. As a result, the nonvolatile memory 104 shifts to the power saving mode (e.g., the auto power saving mode) of saving more power than that in the operation stop state.

Afterward, when the network controller IC 107 receives a wake-up packet when the image forming apparatus 100 is in the power saving state, the network controller IC 107 outputs the interrupt signal 1. When detecting a rising edge of the interrupt signal 1, the control logic unit 103 outputs the interrupt signal 2. Subsequently, when detecting an edge of the interrupt signal 2, the hardware sequencer 102 brings the reset signal 1 to InActive (High).

Figure 4:
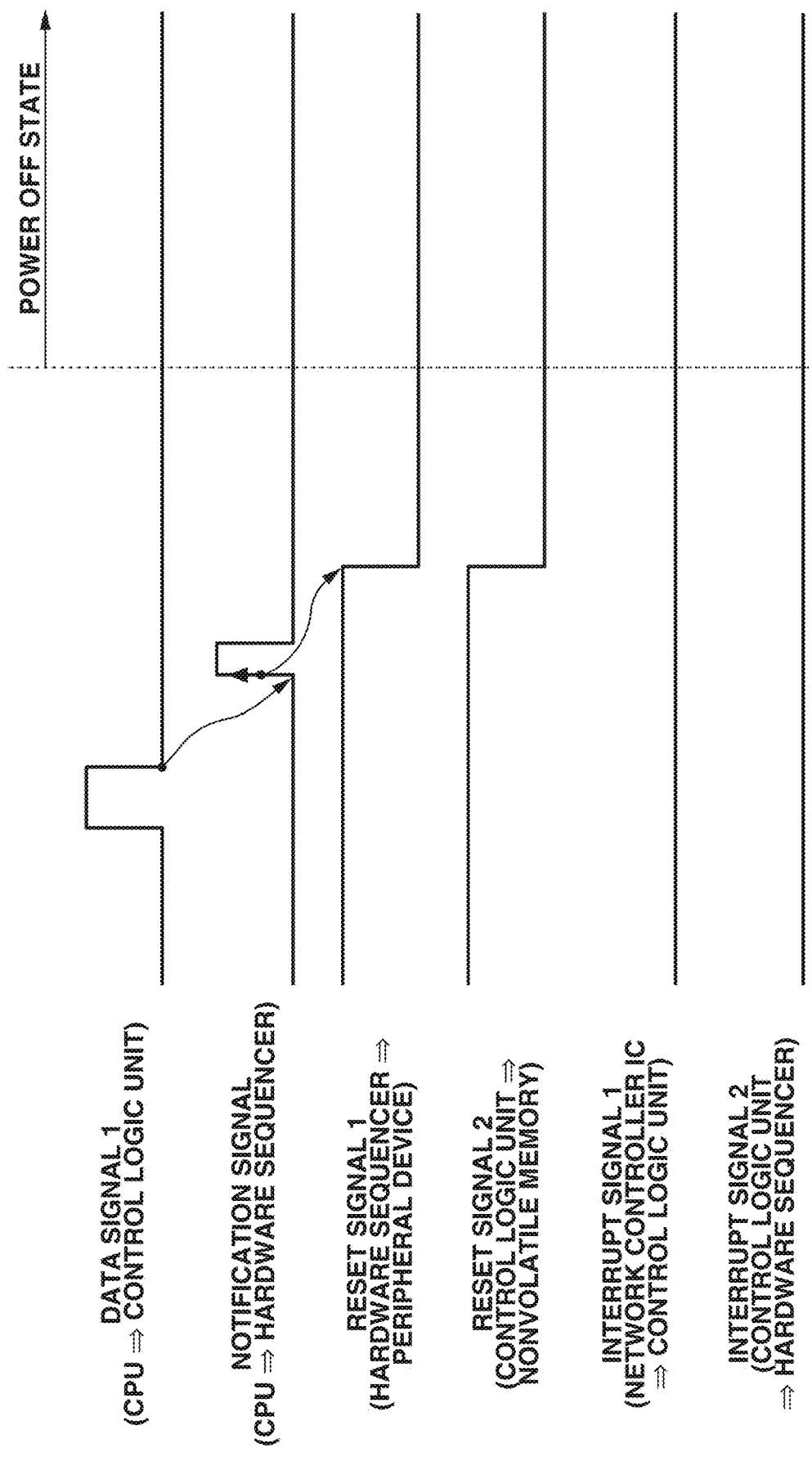
FIG. 4 is a timing chart of each signal when the image forming apparatus shifts to a power off state.

FIG. 4 is a timing chart of each signal when the image forming apparatus 100 shifts to the power off state.

First, the CPU 101 outputs the data signal 1 indicating the power state to which the image forming apparatus 100 shifts next (e.g., the power off state). A value indicating the power state indicated by the data signal 1 is set in the power supply control register of the control logic unit 103.

Next, the CPU 101 that has output the data signal 1 outputs a pulse signal (e.g., the notification signal N) indicating the power off state to the hardware sequencer 102.

Upon detecting a rising edge of the notification signal N, the hardware sequencer 102 brings the reset signal 1 to Active (Low) in order to reset the peripheral device. At this moment, the reset signal 1 to be input to the control logic unit 103 is also Active (Low). Since the value of the power supply control register indicates the power off state, the control logic unit 103 outputs the reset signal 2 having the same logic (Low) as that of the reset signal 1. In other words, the control logic unit 103 does not mask the reset signal 1, in a case where the value of the power supply control register indicates the power off state. The nonvolatile memory 104 can be reset before a shift to the power off state. As a matter of course, the interrupt signal 1 and the interrupt signal 2 are not output in the power off state.

Figure 5:
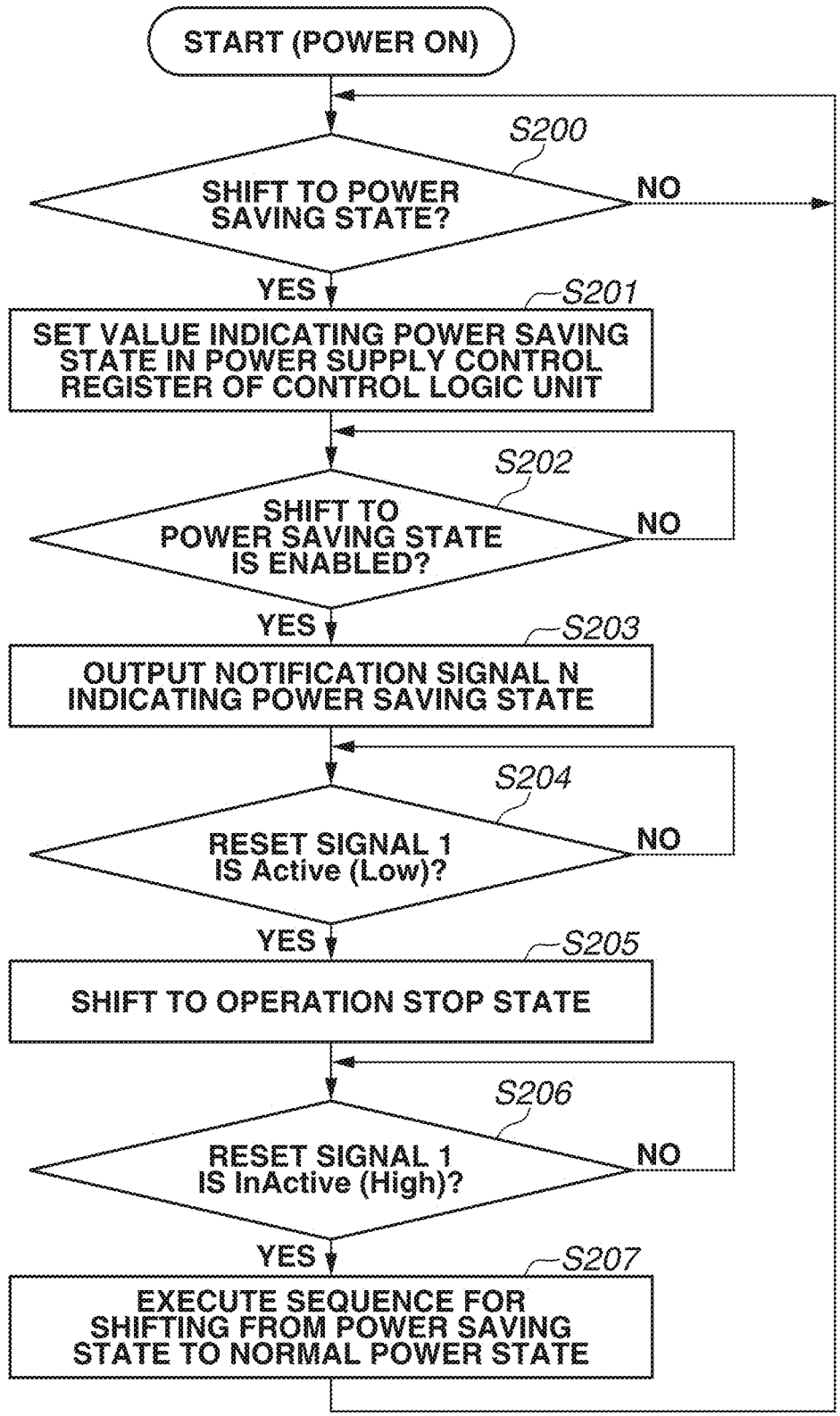
FIG. 5 is a flowchart illustrating processing to be executed by a central processing unit (CPU).

FIG. 5 is a flowchart indicating processing to be executed by the CPU 101.

When the power supply switch is pressed and power is supplied to the hardware sequencer 102, the hardware sequencer 102 brings the reset signal 1 to InActive (High). When the reset signal 1 becomes InActive (High), the CPU 101 sequentially executes software such as a program stored at an address indicated by a reset vector and the OS. The image forming apparatus 100 thereby shifts to the normal power state.

In S200, the CPU 101 waits for an instruction for shifting to the power saving state to come from the OS, in the normal power state.

If the CPU 101 determines to shift to the power saving state based on the received instruction (YES in S200), the processing proceeds to S201. The instruction occurs, for example, when a predetermined time during which an operation unit (not illustrated) is not operated has elapsed or a button such as a power saving button provided in the operation unit is pressed. In S201, the CPU 101 sets the value indicating the power saving state in the power supply control register of the control logic unit 103.

In S202, when the value indicating the power saving state is set in the power supply control register, the CPU 101 waits until a shift to the power saving state is enabled, while checking the process status of a running program. If the shift to the power saving state is enabled (YES in S202), the processing proceeds to S203. In S203, the CPU 101 outputs the notification signal N indicating the power saving state to the hardware sequencer 102. The hardware sequencer 102 brings the reset signal 1 to Active (Low), based on the notification signal N indicating the power saving state. In S204, the CPU 101 determines whether the reset signal 1 is Active (Low). If the reset signal 1 is Active (Low) (YES in S204), the CPU 101 is reset by the reset signal 1, and the processing proceeds to S205. In S205, the CPU 101 shifts to the operation stop state.

For example, when the network controller IC 107 receives a wake-up packet, the interrupt signal 1 and the interrupt signal 2 are output. When detecting an edge of the interrupt signal 2, the hardware sequencer 102 brings the reset signal 1 to InActive (High). Thus, the reset of the CPU 101 is canceled, so that the CPU 101 shifts from the operation stop state to the operation enabled state. In S206, the CPU 101 determines whether the reset signal 1 is InActive. If the reset signal 1 is InActive (YES in S206), the processing proceeds to S207. In S207, the CPU 101 executes a sequence different from the activation sequence, and shifts to the state where a program can run. Specifically, the CPU 101 executes a sequence for shifting from the power saving state to the normal power state. The processing then proceeds to S200, and in this operation, the CPU 101 waits for an instruction from the OS to shift to the power saving state, in the normal power state.

Figure 6:
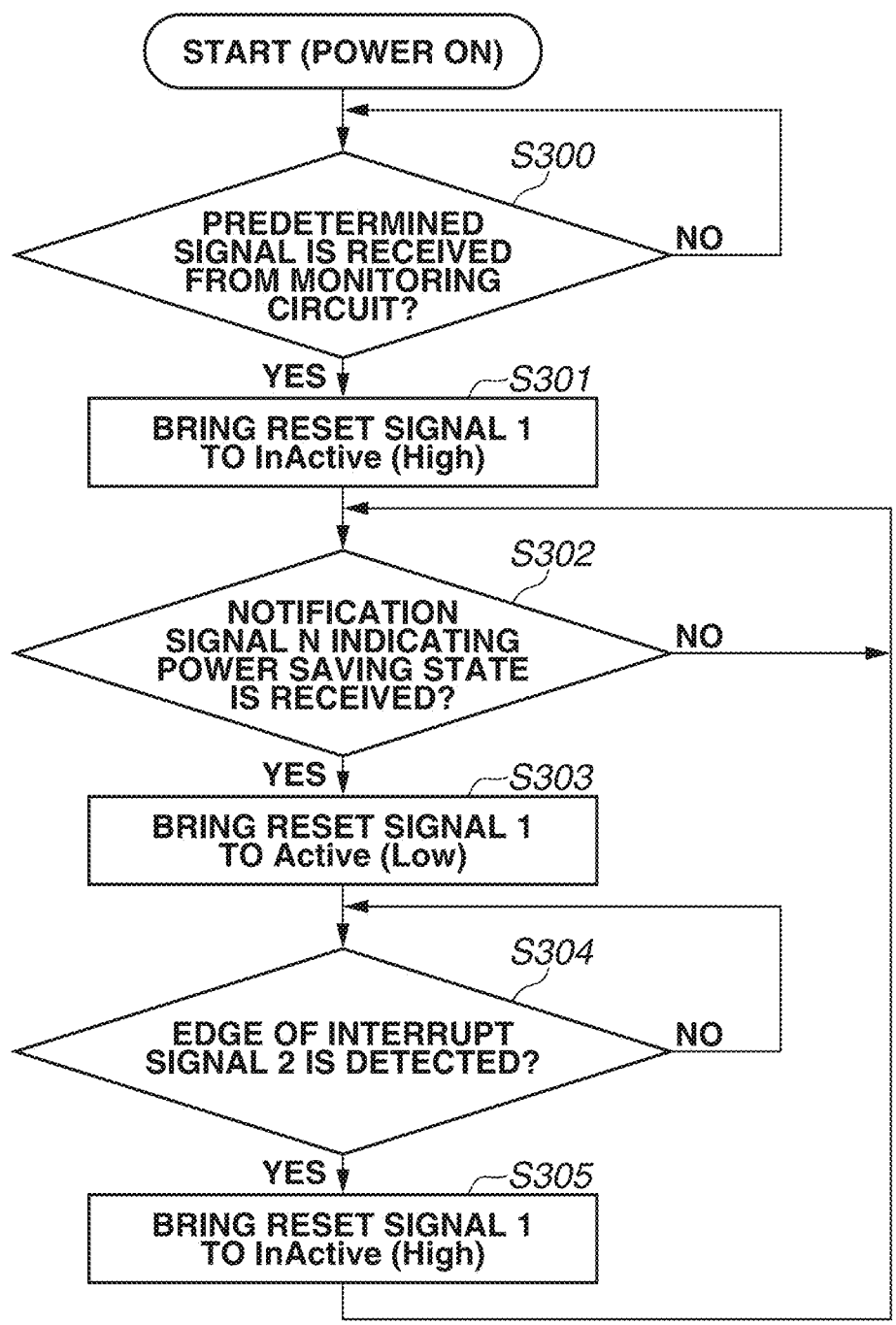
FIG. 6 is a flowchart illustrating processing to be executed by a hardware sequencer.

FIG. 6 is a flowchart indicating processing to be executed by the hardware sequencer 102.

When the power supply switch is pressed, a voltage level output from the power supply unit 110 gradually increases. When the voltage level becomes greater than or equal to a predetermined value, a monitoring circuit (not illustrated) outputs a predetermined signal. In S300, the hardware sequencer 102 determines whether the predetermined signal is received from the monitoring circuit. If the predetermined signal is received (YES in S300), the processing proceeds to S301. In S301, the hardware sequencer 102 brings the reset signal 1 to InActive (High). This cancels the reset of the CPU 101, so that the CPU 101 enters the state where the operation is enabled.

Subsequently, in S302, the hardware sequencer 102 determines whether the notification signal N indicating the power saving state is received from the CPU 101. If the notification signal N indicating the power saving state is received (YES in S302), the processing proceeds to S303. In S303, the hardware sequencer 102 brings the reset signal 1 to Active (Low), thereby resetting the peripheral devices such as the CPU 101 and the ASIC 106. The reset peripheral devices enter the operation stop state.

Subsequently, in S304, the hardware sequencer 102 determines whether an edge of the interrupt signal 2 output from the control logic unit 103 is detected. If the edge of the interrupt signal 2 is detected (YES in S304), the processing proceeds to S305. In S305, the interrupt signal 2 brings the reset signal 1 to InActive (High). This cancels the reset of the peripheral devices such as the CPU 101 and the ASIC 106, so that the peripheral devices enter the operation enabled state.

Figure 7:
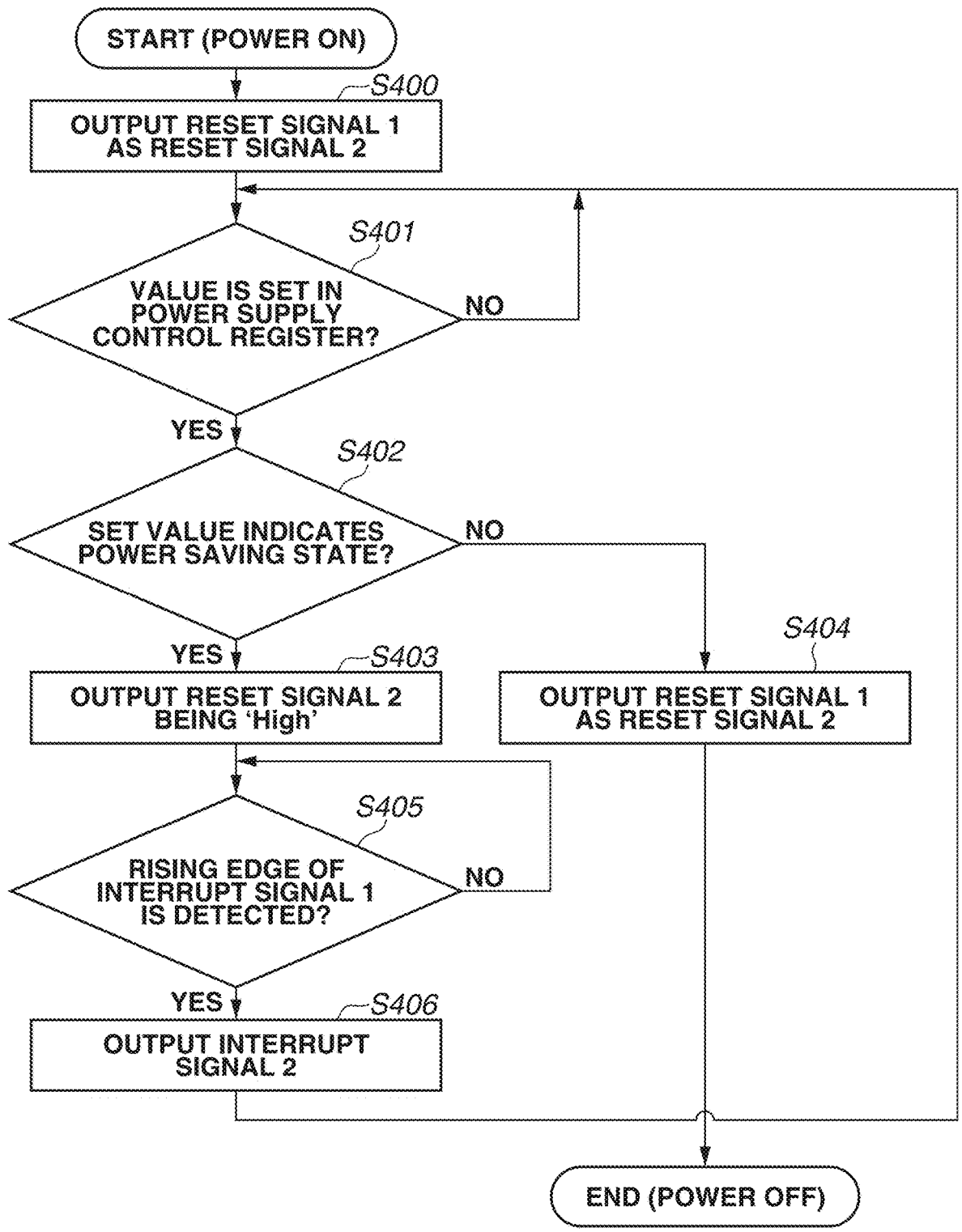
FIG. 7 is a flowchart illustrating operation of a control logic unit.

FIG. 7 is a flowchart indicating operation of the control logic unit 103.

In S400, immediately after the image forming apparatus 100 is activated, the control logic unit 103 outputs the reset signal 2 having the same logic as that of the reset signal 1, without masking the reset signal 1. In other words, the control logic unit 103 directly outputs the reset signal 1 as the reset signal 2.

Subsequently, in S401, the control logic unit 103 waits until a value is set in the power supply control register by the CPU 101. If the value is set in the power supply control register (YES in S401), the operation proceeds to S402. In S402, the control logic unit 103 determines whether the set value indicates the power saving state.

If the set value indicates the power saving state (YES in S402), the operation proceeds to S403. In S403, the control logic unit 103 brings the reset signal 2 to InActive. In other words, in S403, the control logic unit 103 outputs the reset signal 2 at the High level. In S403, the reset signal 2 is brought to the High level, irrespective of the signal level of the reset signal 1, so that the nonvolatile memory 104 is not reset.

On the other hand, if the set value indicates the power off (NO in S402), the operation proceeds to S404. In S404, the control logic unit 103 outputs the reset signal 2 as-is, without changing the logic of the reset signal 1. In the present exemplary embodiment, the power supply to the nonvolatile memory 104 stops after the nonvolatile memory 104 enters the operation stop state.

After the image forming apparatus 100 shifts to the power saving state, in S405, the control logic unit 103 waits until the interrupt signal 1 output from the network controller IC 107 is input and determines whether a rising edge of the interrupt signal 1 is detected. If a rising edge of the interrupt signal 1 is detected (YES in S405), the operation proceeds to S406. In S406, the control logic unit 103 outputs the interrupt signal 2 in order to cancel the reset of the CPU 101.

The above-described control can prevent the reset signal 2 from being input to the nonvolatile memory 104, when the image forming apparatus 100 shifts to the power saving state. If the reset signal 2 is not input to the nonvolatile memory 104, the nonvolatile memory 104 can shift to the power saving mode in which the power consumption is less than that in the operation stop state.

Figure 8:
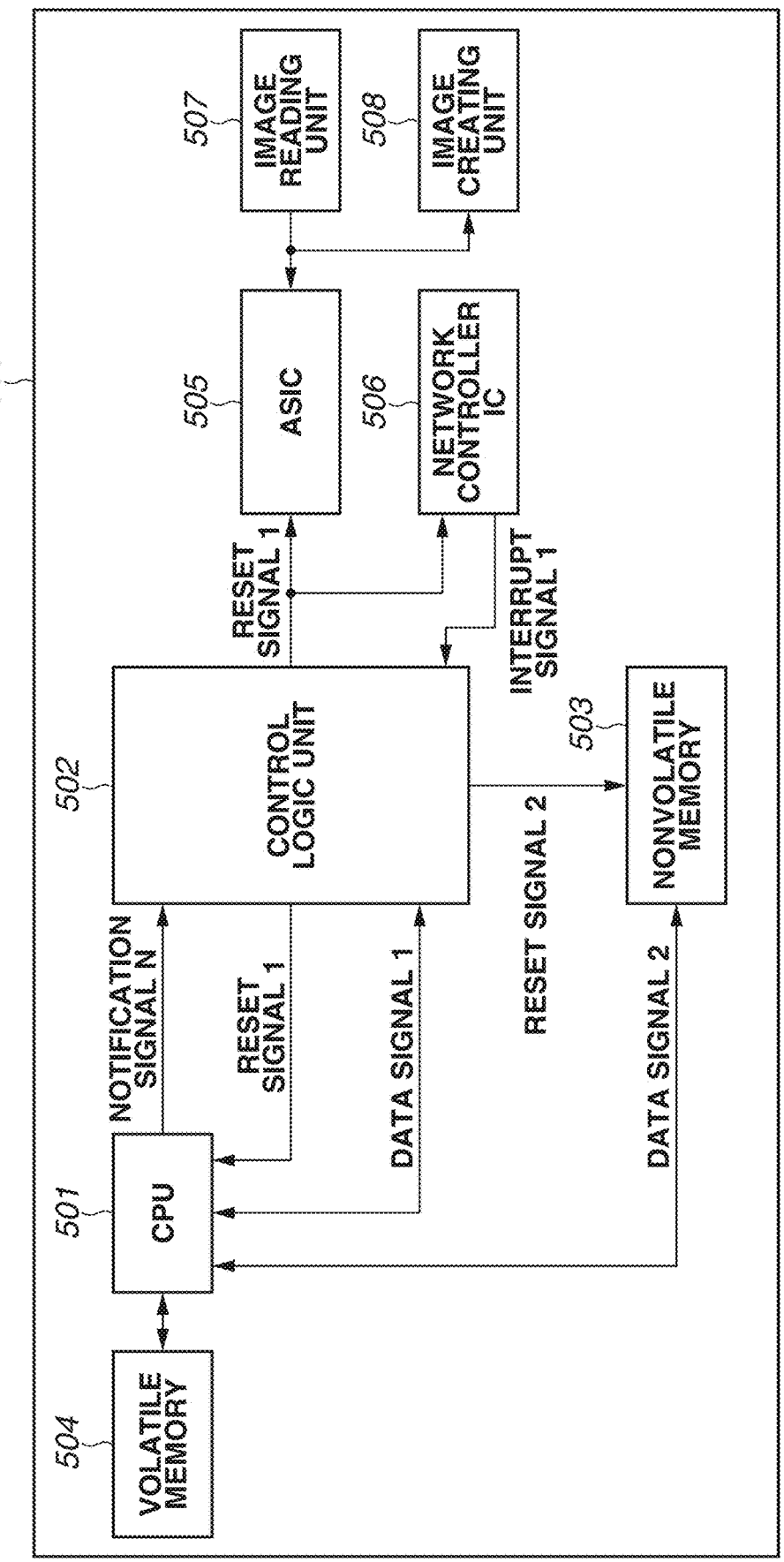
FIG. 8 is a hardware block diagram of an image forming apparatus.
Figure 9:
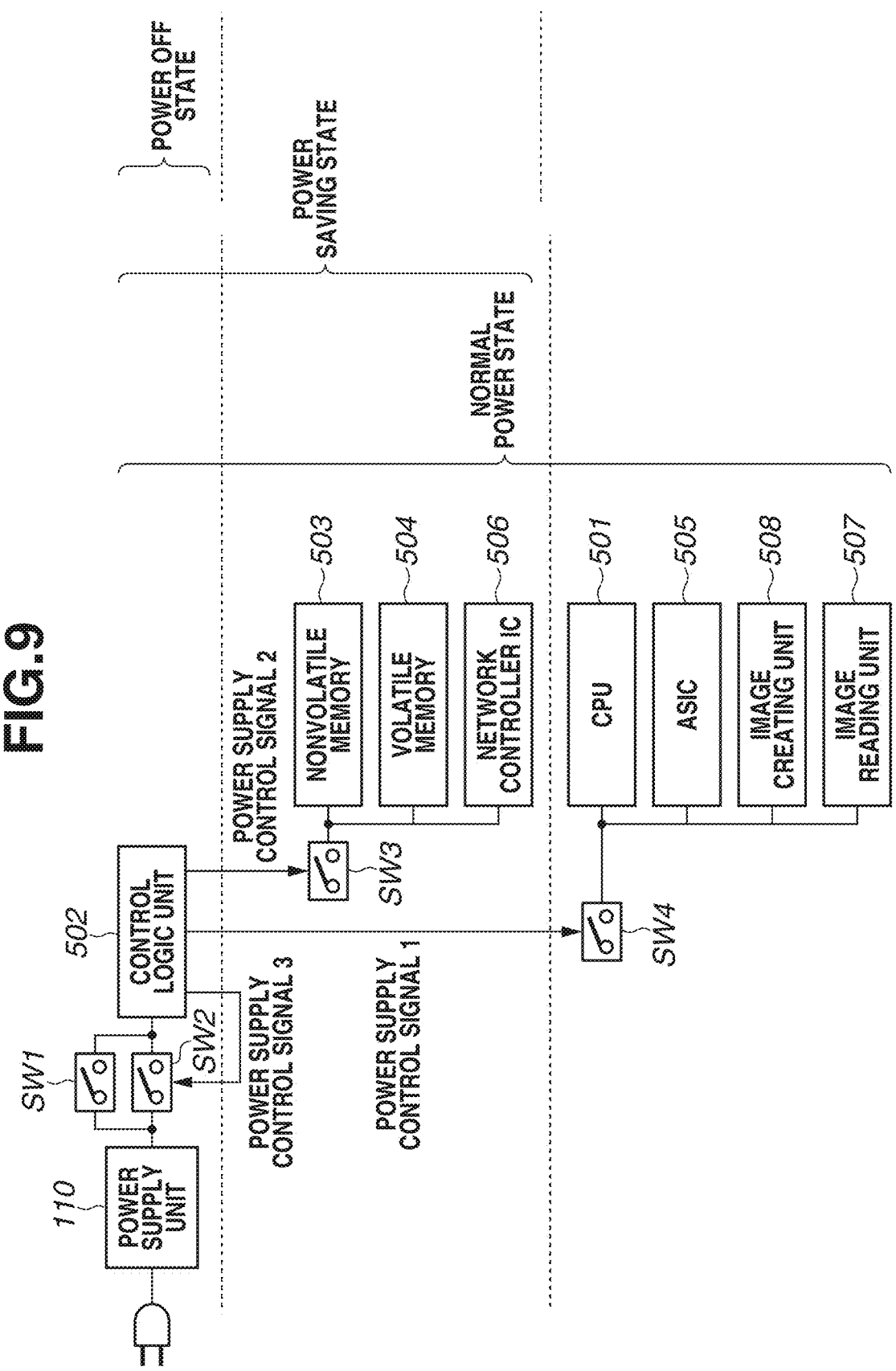
FIG. 9 is a power distribution diagram of the image forming apparatus.

FIG. 8 is a hardware block diagram of an image forming apparatus 500 according to a second exemplary embodiment. FIG. 9 is a power distribution diagram of the image forming apparatus 500.

The image forming apparatus 500 includes a CPU 501, a control logic unit 502, a nonvolatile memory 503, a volatile memory 504, an ASIC 505, a network controller IC 506, an image reading unit 507, and an image creating unit 508. The CPU 501, the nonvolatile memory 503, the volatile memory 504, the ASIC 505, the network controller IC 506, the image reading unit 507, and the image creating unit 508 are similar to those of the first exemplary embodiment and therefore will not be described. The control logic unit 502 of the second exemplary embodiment is different from the control logic unit 103 of the first exemplary embodiment and therefore will be described in detail below.

The control logic unit 502 outputs a reset signal 1. In a case where a notification signal N received from the CPU 501 indicates a power saving state or power off state, the control logic unit 502 brings the reset signal 1 to Active (Low). In a case where the notification signal N received from the CPU 501 indicates a power on state or if an edge of an interrupt signal 1 input from the network controller IC 506 is detected, the control logic unit 502 brings the reset signal 1 to InActive.

The control logic unit 502 outputs a reset signal 2. In other words, the control logic unit 502 can output both the reset signal 1 and the reset signal 2. The reset signal 1 stops the operation of the CPU 501, the ASIC 505, and the network controller IC 506. The reset signal 2 stops the operation of the nonvolatile memory 503.

The control logic unit 502 has a power supply control register. The CPU 501 sets, in the power supply control register, information indicating a power state to which the image forming apparatus 500 shifts via a data signal line. The power supply control register indicates any one of a normal power state, the power saving state, and the power off state. Other functions of the control logic unit 502 are similar to those of the control logic unit 103 of the first exemplary embodiment and therefore will not be described.

Figure 10:
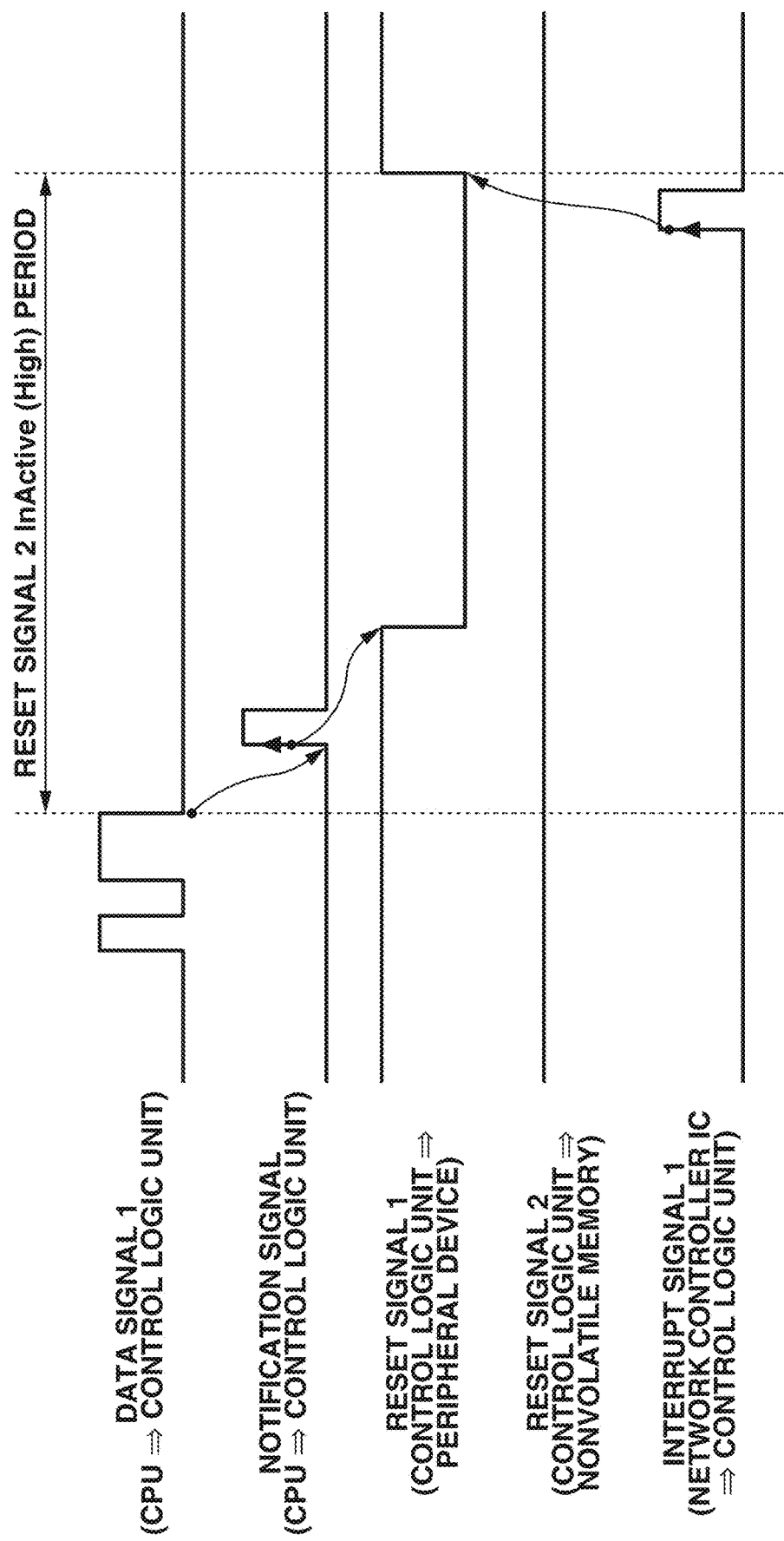
FIG. 10 is a timing chart of each signal when the image forming apparatus shifts to a power saving state.

FIG. 10 is a timing chart of each signal when the image forming apparatus 500 shifts to the power saving state. The waveform in the timing chart in FIG. 10 and a timing chart in FIG. 11 is only an example, and is not intended to limit, for example, the logic of a signal and the waveform of a signal, and to specify whether a trigger is an edge trigger or a level trigger.

The CPU 501 outputs a data signal 1 indicating the power state (e.g., the power saving state) to which the image forming apparatus 500 shifts next. A value indicating the power state indicated by the data signal 1 is set in the power supply control register of the control logic unit 502.

Next, the CPU 501 that has output the data signal 1 outputs a pulse signal (e.g., the notification signal N) indicating the power saving state to the control logic unit 502.

Upon detecting a rising edge of the notification signal N, the control logic unit 502 brings the reset signal 1 to Active (Low) in order to reset a peripheral device. At this moment, since the value of the power supply control register indicates the power saving state, the control logic unit 502 does not bring the reset signal 2 to Active. In other words, the control logic unit 502 outputs the reset signal 2, based on the value of the power supply control register. The reset signal 2 to be input to the nonvolatile memory 503 thereby remains InActive. Therefore, the reset signal 2 is not input to the nonvolatile memory 503, when the image forming apparatus 500 is in the power saving state. Accordingly, the nonvolatile memory 503 shifts to a power saving mode (e.g., an auto power saving mode) of saving more power than that in an operation stop state.

Afterward, if the network controller IC 506 receives a wake-up packet when the image forming apparatus 500 is in the power saving state, the network controller IC 506 outputs the interrupt signal 1. When detecting a rising edge of the interrupt signal 1, the control logic unit 502 brings the reset signal 1 to InActive (High).

FIG. 11 is a timing chart of each signal when the image forming apparatus 500 shifts to the power off state.

The CPU 501 outputs the data signal 1 indicating the power state (e.g., the power off state) to which the image forming apparatus 500 shifts next. A value indicating the power state indicated by the data signal 1 is set in the power supply control register of the control logic unit 502.

Next, the CPU 501 that has output the data signal 1 outputs a pulse signal (e.g., the notification signal N) indicating the power off state to the control logic unit 502.

Upon detecting a rising edge of the notification signal N, the control logic unit 502 brings the reset signal 1 to Active (Low) in order to reset the peripheral device. Further, the control logic unit 502 brings the reset signal 2 to Active (Low), because the value of the power supply control register indicates the power off state. In other words, in a case where the value of the power supply control register indicates the power off state, the control logic unit 502 outputs the reset signal 2. The nonvolatile memory 503 can be reset before a shift to the power off state. Naturally, the interrupt signal 1 and the interrupt signal 2 are not output in the power off state.

The above-described control can prevent the nonvolatile memory 503 from being reset when the image forming apparatus 500 shifts from the normal power state to the power saving state. The nonvolatile memory 503 thereby enters the power saving mode in which less power is consumed than that when the operation is stopped by the reset.

Other Embodiments

Some embodiment(s) can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiments(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2018-139581, which was filed on Jul. 25, 2018 and which is hereby incorporated by reference herein in its entirety.

What is claimed is:

1. An information processing apparatus that shifts to at least a first power state and to a second power state where more power is saved than that in the first power state, the information processing apparatus comprising:
   an output unit configured to output an operation stop signal;
   a device configured to receive an operation stop signal, and configured to shift to an operation stop state based on the operation stop signal, and to a power saving mode of saving more power than that in the operation stop state when predetermined signals including the operation stop signal is not input during a predetermined time; and
   a signal output unit configured to receive the operation stop signal output from the output unit, and configured to output the operation stop signal to the device based on information indicating a power state of the information processing apparatus.

2. The information processing apparatus according to claim 1, further comprising a storage unit configured to store the information indicating the power state of the information processing apparatus,
   wherein the signal output unit outputs the operation stop signal to the device based on the information indicating the power state of the information processing apparatus stored in the storage unit.

3. The information processing apparatus according to claim 2, further comprising a power supply unit,
   wherein the signal output unit controls power to be output from the power supply unit based on the information stored in the storage unit.

4. The information processing apparatus according to claim 3, wherein the signal output unit outputs the operation stop signal to the device, based on the operation stop signal received from the output unit, in a case where the information indicates the first power state.

5. The information processing apparatus according to claim 1, wherein the signal output unit does not output the operation stop signal to the device even if the signal output unit receives the operation stop signal from the output unit, in a case where the information indicates the second power state.

6. The information processing apparatus according to claim 1, further comprising a computing unit configured to access the device, wherein the device shifts to the power saving mode when, during the predetermined time, the predetermined signals including the operation stop signal are not input and the device is not accessed from the computing unit.

7. The information processing apparatus according to claim 6,
   wherein the computing unit outputs the information indicating a power state of the information processing apparatus, and
   wherein the signal output unit outputs the operation stop signal to the device based on the information indicating the power state of the information processing apparatus output from the computing unit.

8. The information processing apparatus according to claim 1,
   wherein the information processing apparatus further shifts to a third power state where more power is saved than that in the second power state, and
   wherein the signal output unit outputs the operation stop signal to the device, based on the operation stop signal received from the output unit, in a case where the information indicates the third power state.

9. The information processing apparatus according to claim 8, wherein power supply to the device is stopped in the third power state.

10. The information processing apparatus according to claim 1, wherein the device is an embedded Multi-Media Card.

11. The information processing apparatus according to claim 1, wherein the operation stop signal is a reset signal.

12. The information processing apparatus according to claim 1, further comprising a printing unit configured to print an image on a printing medium.

13. The information processing apparatus according to claim 1, further comprising a reading unit configured to output image data by reading an image of a document.

14. A control method for an information processing apparatus that shifts to at least a first power state and to a second power state where more power is saved than that in the first power state, and includes a device that is configured to receive an operation stop signal, and configured to shift to an operation stop state based on the operation stop signal, and to a power saving mode of saving more power than that in the operation stop state when predetermined signals including the operation stop signal is not input during a predetermined time, the control method comprising:
   outputting information indicating a power state of the information processing apparatus; and
   outputting the operation stop signal to the device based on the information indicating the power state of the information processing apparatus.

* * * * *